R. MARSH.
Lamps.
No. 158,103.
Patented Dec. 22, 1874.
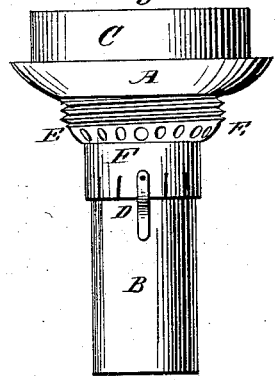
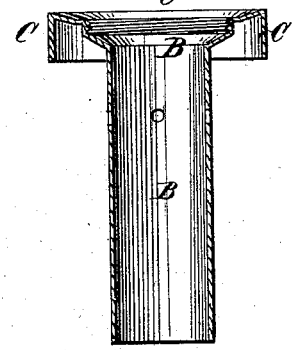
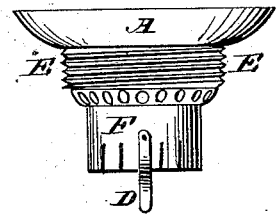
Witnesses:
Charles R. Miles
Isaac Blodgood
Inventor:
Ricerius Marsh

UNITED STATES PATENT OFFICE.

RIVERIUS MARSH, OF FLUSHING, NEW YORK.

IMPROVEMENT IN LAMPS.

Specification forming part of Letters Patent No. 158,103, dated December 22, 1874; application filed April 24, 1874.

*To all whom it may concern:*

Be it known that I, RIVERIUS MARSH, of Flushing, in the county of Queens and State of New York, have invented a new and useful Improvement in Lamps; and I do declare the following is a true and accurate description thereof, reference being had to the accompanying drawing, and to the letters of reference marked thereon, they being a part of the specification, in which—

Figure 1 shows my invention ready to be applied to a lamp. Fig. 2 shows safety-tube and collar attached separate from feeder and guide. Fig. 3 shows feeder and guide, also spring.

Like letters refer to like parts in figures.

This invention relates to an improvement in lamps, whereby the lamps may be filled with safety without removing globe, shade, or chimney, or unscrewing the burner, consisting in a simple cup, so formed as to serve the combined purpose of oil-receiver, drip-cup, gas-escape, and guide for safety-tube. To this cup may be attached a spring, or any other substitute for guiding and sustaining safety-tube when elevated or being raised from the drip-cup for filling the lamp. When closed a chamber is formed, in which the vapor rising from the oil is condensed and returns into the lamp, as more fully hereinafter set forth.

In the drawing, A represents a cup for an oil-receiver and drip-cup; E, holes between screw and guide, (or guide and safety-tube;) F, guide for raising and lowering safety-tube evenly; D, spring to hold safety-tube when elevated; C, condensing-chamber, formed by lowering the safety-tube to its proper position for general use; B, collar combined to, or made a part of, safety-tube.

I claim as my invention, and desire to secure by Letters Patent—

The combination of the drip-cup and the safety-tube, having a collar for the formation of a condensation-chamber, as described.

The above specification of my invention signed by me this 21st day of April, A. D. 1874.

RIVERIUS MARSH.

Witnesses:
    CHARLES R. MILES,
    ISAAC BLOODGOOD.